May 4, 1965

W. JOSEPH 3,181,200

HEATING AND COOLING MEANS FOR FLAT PHONOGRAPH RECORD DIE

Filed Dec. 19, 1962

INVENTOR.
WILLIAM JOSEPH

BY Darby & Darby

ATTORNEY

3,181,200
HEATING AND COOLING MEANS FOR FLAT PHONOGRAPH RECORD DIE

William Joseph, Livingston, N.J., assignor to Metro-Goldwyn-Mayer Inc., New York, N.Y., a corporation of New York
Filed Dec. 19, 1962, Ser. No. 245,690
6 Claims. (Cl. 18—5.3)

The present invention relates to a plastic molding die or plate and more particularly to a die plate utilized in the molding of plastic disk phonograph records and the like.

More particularly still the invention relates to a molding die for a record stamper which is provided with passages for heating and cooling fluid so arranged as to rapidly and uniformly alternately heat and cool the stampers so that a record may be pressed from softened plastic material rapidly, and rapidly cooled so that the pressed record may be removed from the stampers, the entire operation being performed in a much shorter time than has heretofore been possible.

At the present time it is common practice to utilize a hydraulic ram for producing disk phonograph records. A fixed portion of the ram carries one stamper die which is provided with passageways through which heating and cooling fluid is circulated. The movable element or ram of the press carries a similar die through which heating and cooling fluid is likewise circulated. These dies currently comprise a steel plate having concentric grooves therein so arranged that heating and cooling fluid is conducted to a groove adjacent the center of the plate and thereafter through radial passageways flows from this groove to the next outer groove and thence around that groove through substantially 180° in both directions to an additional radial passage which conducts the fluid to the next outer groove, thence through that groove in both directions through arcs of substantially 180° and through a radial passage to the next groove proceeding thus until the outermost groove is reached to which groove a discharge pipe is connected.

Such molding dies are provided with steam to heat the stampers and the softened plastic material placed therebetween after which the record is pressed, the steam replaced with cooling water, and the press opened so that the record may be removed. Utilizing the old form of grooved die described hereinabove, it has been found that the die was heated to the desired temperature at the center portion thereof in 4 seconds, but that the rim portion did not acquire the desired temperature until 4 seconds later.

Also, in cooling it has been found that the center portion reached the desired temperature in approximately 8 seconds while the rim required an additional 8 seconds to come to this temperature. As a result not only was it necessary that a total of 24 seconds be taken in performing the heating and cooling operations, but also because of the lack of uniformity of temperature the records produced had stresses therein which frequently resulted in warped rather than flat records, the warping in some instances being sufficient to cause the records pressed to be rejected as unsalable and even, in instances where they were not rejected, producing less perfect records than would otherwise have been the case.

The total time to produce a record utilizing this old form of die was approximately 40 seconds and 15 gallons of water was consumed in cooling each record.

My present invention supplies a die for molding processes which, due to the configuration of the passageways for feeding and cooling the fluid and the use of turbulence producing members in the passageways, makes possible the production of records at the rate of one in 28 seconds and in addition, since the center and rim portions of the stampers are brought to the desired high or low temperatures in approximately 4 seconds there is no lack of uniformity of heating and cooling of the record and thus no stress set up which results in warping or concavity. As a result the number of rejects is minimized and the rate of production is vastly increased. Additionally, the rate of water consumption is reduced by 50% and in cooling each record only 7½ gallons of water is necessary.

When using the usual type of stamper dies or backing plates with the groove configurations described above, the industry standard was that the steam would be supplied at 135 pounds pressure and the water at 140 pounds, the steam temperature being 325° and the water temperature 72°. While with the new die plates I have found it practical to utilize steam at a temperature of 325° and water at approximately 72° as before, increased temperatures and pressures may be utilized and the production further increased especially when the record press is automatically operated.

With the old dies the dies and stampers reached a temperature of 295° prior to the pressing operation and the dies and stampers were cooled to 95° whereas with the present invention the elements reach a temperature of 325° and are cooled to 80° utilizing the same steam and water temperatures and pressures.

It is an object of the invention to provide record molding dies provided with passages for the flow of heating and cooling fluids so ararnged as to materially reduce the time required for heating and cooling during the record forming or pressing cycle.

It is a further object of the invention to provide such molding dies having turbulence producing members therein which provide for more rapid heating and cooling and in combination with the form of passageway also provide for more uniform heating and cooling.

It is another object of the invention to provide such dies which, in addition to improving the uniformity of heating and cooling and the time required for the complete cycle of heating and cooling, require less of the cooling fluid than has heretofore been possible.

It is a still further object of the invention to provide dies which yield the advantages mentioned above when heating and cooling fluids are supplied to the dies at the same pressures and temperatures heretofore used and which furthermore provide even greater advantages when heating and cooling fluids which supply higher pressures and with an increased temperature difference between the heating and cooling fluids.

Other objects and features of the invention will be apparent when the following description is considered in connection with the annexed drawings, in which:

FIGURE 3 is a side elevational view of one of the turbulence creating members of FIGURES 1 and 2.

Figure 1:
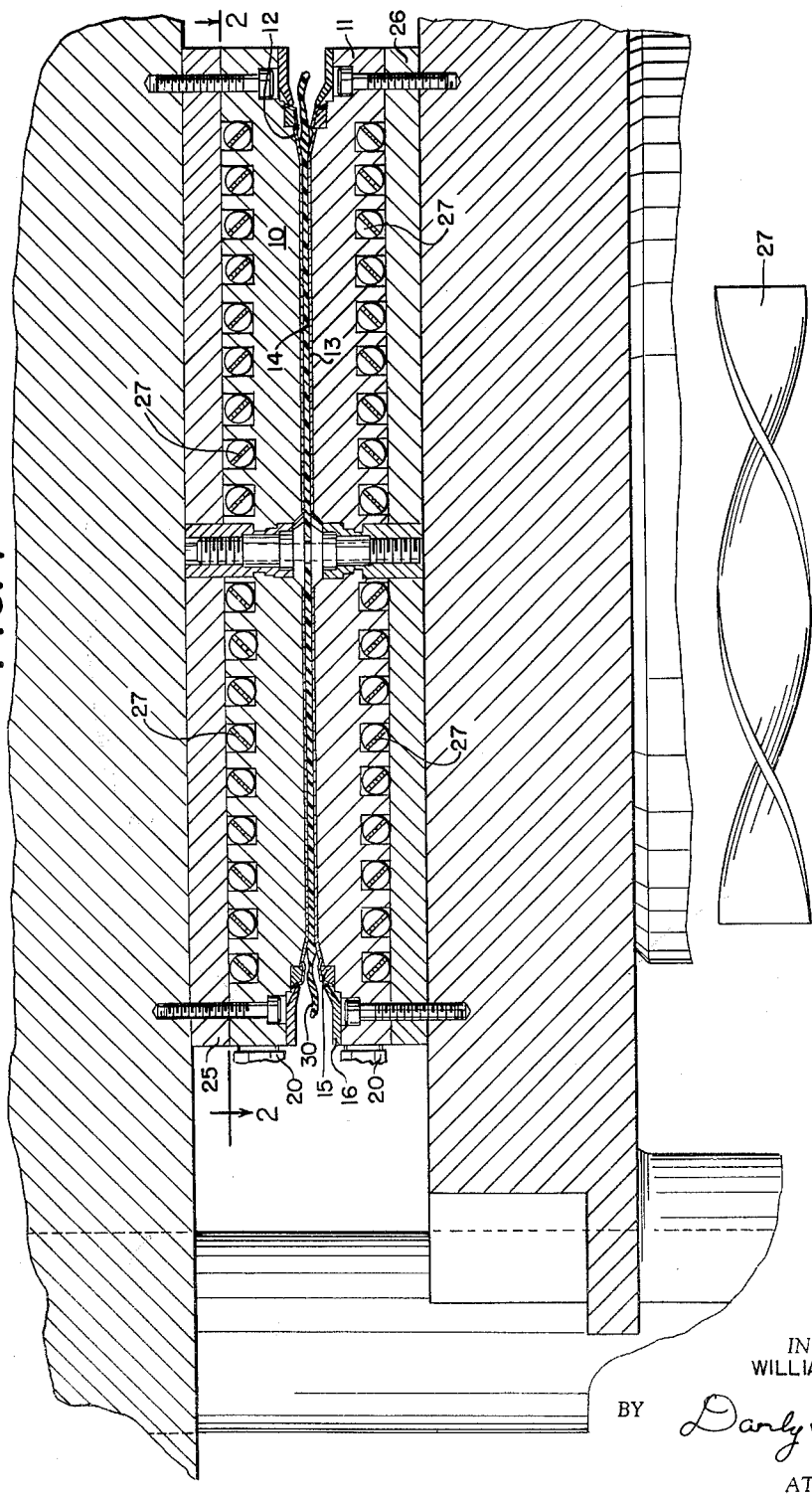
FIGURE 1 is a fragmentary vertical cross-sectional view of a record press showing the dies and stampers in position with a record in place between the two stampers.

Referring now to the drawings there are shown a 10 and 11 two molding dies in accordance with my invention, each die having fixed to the surface thereof a stamper 12 or 13 which stampers, as is well known, have grooves formed on the facing surfaces thereof corresponding to a recording which is to be duplicated in the plastic material from which the record 14 is made.

In the usual manner the stampers, which are quite thin are stretched over the dies and over a coining ring 15 and held in position by a clamping ring 16.

Figure 2:
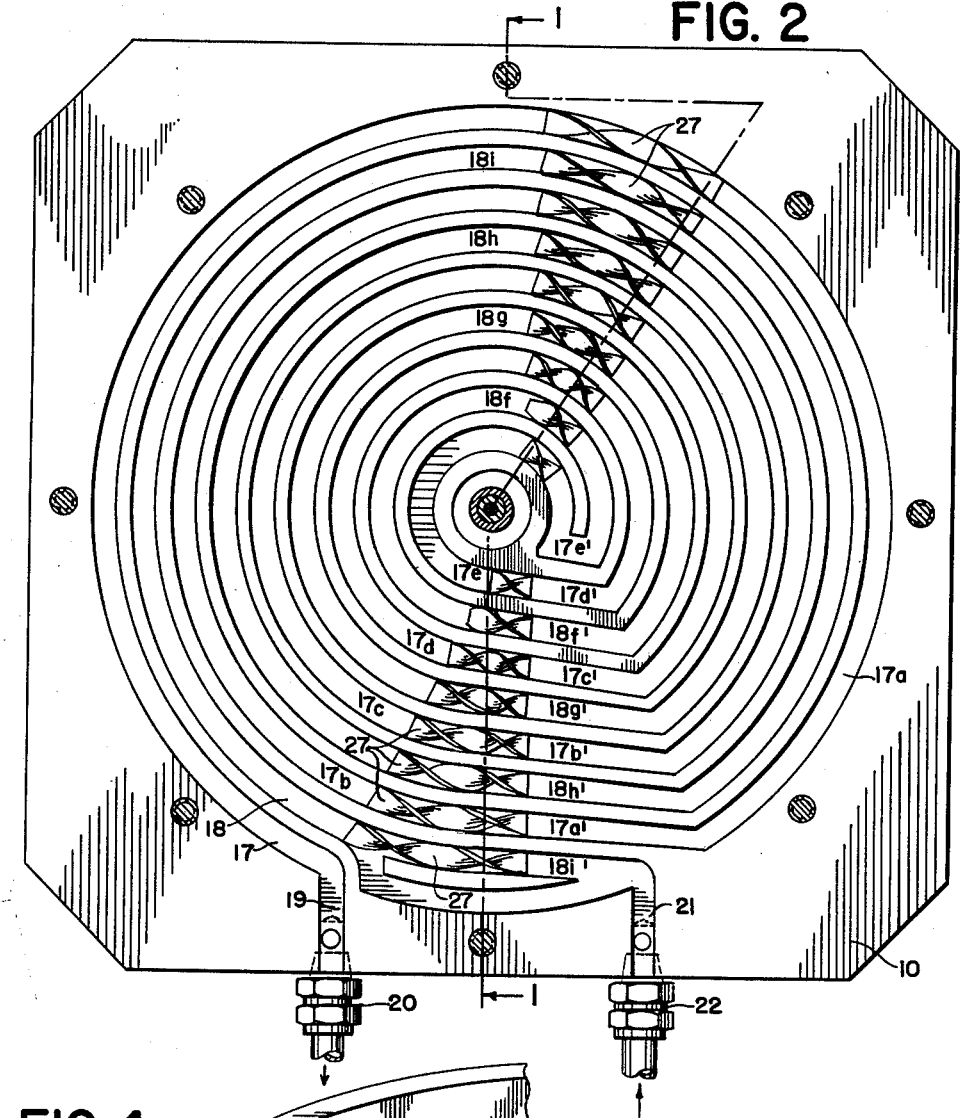
FIGURE 2 is a horizontal cross-sectional view of one of the dies of my invention showing the form of the fluid passageways and showing also turbulence creating members in these passageways. This view is taken on the plane of the line 2—2 of FIGURE 1.

As indicated the dies 10 and 11 are exactly similar, therefore only one is described in detail, this being the die 10 shown in FIGURE 2.

Die 10 is formed with a pair of interspersed spiral grooves being interconnected at their inner end to form a spiral passageway through which fluid may enter and leave the die passageways.

In order to minimize the cost of production of the dies the spiral grooves 17 and 18 are not true spirals but are instead formed from concentric circular portions joined by straight line portions. Thus the groove 17 is formed of the circular portions 17a, 17b, 17c, 17d, 17e, the portions 17a and 17b being joined by portions 17a', portions 17b and 17c being joined by straight portion 17b', circular portions 17c and 17d being joined by straight portion 17c' and circular portions 17d and 17e being joined by straight portion 17d'. Circular portion 17e is joined to circular portion 18f by means of straight portion 17e' and in like manner portions 18f, 18g, 18h and 18i are joined by respective straight portions 18f', 18g', 18h' and 18i'.

The spiral groove 17 terminates in a passageway 19 which, by means of a pipe coupling 20, may be connected to a discharge line for heating and cooling fluid. In like manner the spiral passageway 18 and particularly the portion 18i' thereof connects with a passageway 21 which is provided with a pipe fitting 22 which is connected to a supply of heating and cooling fluid alternately. The straight portions 17a' through 17e' and 18f' through 18i' are of varying linear extent, but are arranged as is clearly shown in the drawing to occupy substantially the same angular extent, each of these straight portions subtending an angle of approximately 30°.

It should also be noted that the groove portion 18i has a circular portion 23, lying radially outward thereof and being separated from the portion 18i' by the land 24. This is done to assure that the entire circumference of the stamper and the die be heated and cooled since otherwise the portion 23 would not have any fluid flowing therethrough and might therefore be an area the temperature of which did not follow that of the remaining portion of the die.

As is clearly shown in FIGURE 1, each of the dies 10 and 11 is provided with a cover plate, these cover plates being designated respectively 25 and 26. These plates of course complete the pasageways formed by the grooves 17 and 18.

Although the dies thus far described are superior to the form previously utilized, I have found that even better results can be secured when turbulence producing means are provided in each of the two interspersed spirals 17 and 18.

Referring now again to FIGURE 2, the preferred form of turbulence producing means is a strip of metal 27, for example stainless steel, which is of the same width as the grooves 17 and 18 and which is twisted through approximately one rotation into the form shown in FIGURE 3. Strips 27 are of such length that they extend through an arcuate distance of approximately 20° to 30° with respect to the groove in which they are placed. The strips in the outermost grooves have substantially a full 360° rotation from end to end, that is, they are of a pitch of one turn per length whereas those in the innermost grooves have somewhat less than one turn per length.

These dimensions are not critical but are those which I have found to be efficient in providing the necessary turbulence and temperature distribution throughout the dies during both the heating and cooling periods.

Figure 4:
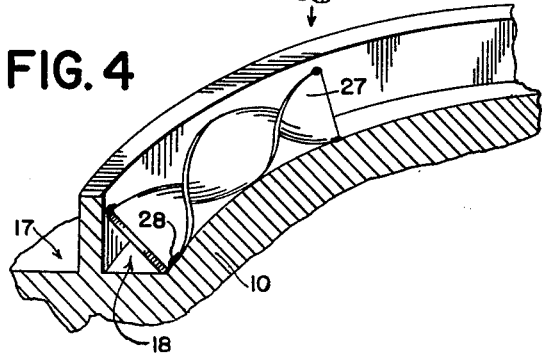
FIGURE 4 is a fragmentary perspective view of one of the dies showing the mode in which a turbulence creating member is fixed in position in its passageway.

These strips are fixed in the grooves by any suitable means such for example as the spot welding indicated at 28 in FIGURE 4.

The series of strips 27 is duplicated on substantially opposite sides of the die structure as clearly shown in FIGURE 2, this arrangement again substantially increasing the efficiency of heat transfer between the heating and cooling mediums and the die structure and assuring that the temperature distribution during both the heating and cooling periods be even.

As indicated hereinabove, it is possible to utilize turbulence creating strips of different lengths than those described and also possible to use more or less of these strips in each turn of the spirals 17 and 18. However, I have found that the use of strips of the arcuate extent mentioned with two strips per groove spaced approximately at 180° achieves the desired result. The use of spaced strips in each turn of the spiral is preferable to a continuous strip since such a continuous strip would substantially divide the cooling and heating fluids into two streams and tend to limit the turbulence effect produced and thus reduce the desired uniformity of temperature throughout the die structure.

As will be obvious from the above in utilizing the dies of the present invention in the pressing of phonograph records a measured amount of record making material is placed upon the central portion of the lower stamper and the press is then cycled to heat the dies, close the two stampers under hydraulic pressure to press a record from the material into a disk form which, in addition to having the grooves molded therein, will in the usual manner have flash such as indicated at 30 in FIGURE 1 formed thereon. Thereafter cooling fluid is admitted to the spiral passageways through the inlet coupling 22 and the heating medium of course displaced through the outlet coupling 20. The press is then opened and the completed record taken therefrom.

As stated hereinabove, by utilizing the dies of the present construction with the presently utilized steam and water pressures and temperatures, the dies reach their high and low temperatures in a much shorter period of time and uniformly throughout the die area. As a consequence, the time of pressing a record is reduced from approximately 40 seconds to approximately 28 seconds while at the same time assuring that the record is flat and without strains. It should be noted that in general record deformation resulting from stress or strain is of two types, one resulting in concavity of the record and the other resulting in a wavy configuration.

The use of the dies of the present invention has eliminated all warpage of the wave configuration type and furthermore no concavity results if the stampers are truly flat. In addition to the elimination of reject records due to this lack of flatness when the dies of the present invention are utilized, substantially all instances in which the land between the record grooves is not filled out, have also been eliminated.

In fact, the reject rate which ran from 10 to 14% using the old form of dies has been reduced to a maximum of 6% with the new dies, while at the same time the rate of production has been increased. As an example, utilizing the old dies, one operator operating two presses produced an average of 1200 records per working day of which 100 were rejects. The same operator operating two presses with my new dies produced an average of 1540 records per working day with no rejects.

The production advantages set forth above are based upon the use of steam at a temperature of 325° and at 140 pounds pressure and of water at 72° also at 140 pounds pressure which temperatures and pressures were those utilized with the old form of dies and necessary to be utilized since higher pressures and temperatures would cause greater lack of uniformity and temperature throughout the die area and result in greater rather than lesser numbers of imperfect records. When my new form of dies is utilized, however, the temperatures and pressures of the steam may be increased while the temperature of the water may be decreased and the pressure increased to thus produce records at an even higher rate.

The desirability of such higher rates is greater when an automatic record press such as that shown in my copending application Serial No. 219,011, filed August 23, 1962 is utilized than it is with manually operated presses since there is a necessary limitation that an operator must remove the record in a very short period of time in order to prevent the next cycle of the press from heating the material which has just been formed into a record, thus burning the record and in addition not providing material for the following record. As indicated, when the automatic press is used these times can be adjusted so that there is assurance that the records will be promptly removed and material for the ensuing record equally promptly deposited.

While I have described a preferred embodiment of my invention it will be understood that many variations are possible. For example, the interspersed spiral grooves might be joined at the rim rather than at their centers and the heating and cooling fluid inlet and discharge placed at the center while still achieving the desired uniformity of heating and cooling. I wish therefore to be limited not by the foregoing description but on the contrary solely by the claims granted to me.

What is claimed is:

1. In a molding die, in combination, a plate of heat conducting material, a pair of interspersed spiral passages formed therein, each turn of each said spiral passage comprising a major portion in the form of a circle arc and a minor portion in the form of a straight line, said straight line portion joining the circle arc portions of two adjacent turns of the respective spiral adjacent ends of said pair of spiral passages being interconnected to form a continuous passage for the flow of fluid.

2. A molding die in accordance with claim 1 wherein said circle arc portions extend through approximately 330° of arc.

3. A molding die comprising a plate of heat conductive material, a pair of interspersed grooves of rectangular cross section formed therein, said interspersed grooves being formed as a pair of planar spirals, each turn of each said spiral comprising a major portion in the form of a circle arc and a minor portion in the form of a straight line, said straight line portion joining the circle arc portions of two adjacent turns of the respective spiral, said grooves being interconnected at the ends adjacent their common center to form a continuous spiral groove, turbulence producing means comprising a strip of material having a width substantially equal to the smaller dimension of said rectangle and being twisted along its longitudinal axis to form substantially one-half to one and one-half turns in its length fixed in each turn of each of said spiral grooves, the strip in each turn of each spiral having a length equal to from 20 to 40° of the arc of the turn in which it is placed and a cover sealed to said plate to cover the open sides of said rectangular grooves forming a continuous passageway.

4. A molding die as claimed in claim 3 wherein a pair of said turbulence producing strips is fixed in each turn of each said spiral groove, the strips of each pair being spaced substantially 180° apart, the series of strips of respective turns having their midpoints substantially on a radius of said spirals.

5. A molding die as claimed in claim 4 wherein coupling means are connected to the ends of said pair of spirals opposite said interconnection, said coupling means being adapted to provide for supply of heating and cooling fluid to said spiral passageways and discharge of said fluid from the end of said continuous passageway remote from said inlet.

6. A molding die in accordance with claim 5 wherein said plate and cover are substantially square and wherein said spiral passageways are of substantially the diameter of a record to be pressed, said inlet and discharge passageways extending from the ends of said spirals to the perimeter of said plate and cover member.

References Cited by the Examiner
UNITED STATES PATENTS

| | | | |
|---|---|---|---|
| 1,469,747 | 10/23 | Winter | 18—5.3 |
| 1,519,879 | 12/24 | Shapiro | 165—185 |
| 1,805,652 | 5/31 | Caracristi | 165—166 |
| 2,254,587 | 9/41 | Williams | 165—179 XR |
| 2,458,427 | 1/49 | Russel et al. | 18—5.3 XR |

WILLIAM J. STEPHENSON, *Primary Examiner.*

MICHAEL V. BRINDISI, *Examiner.*